March 22, 1949.  A. R. MAIER ET AL  2,465,164
HOIST BRAKES WITH EQUALIZER AND POWER BOOSTER
Filed June 5, 1946  5 Sheets-Sheet 1
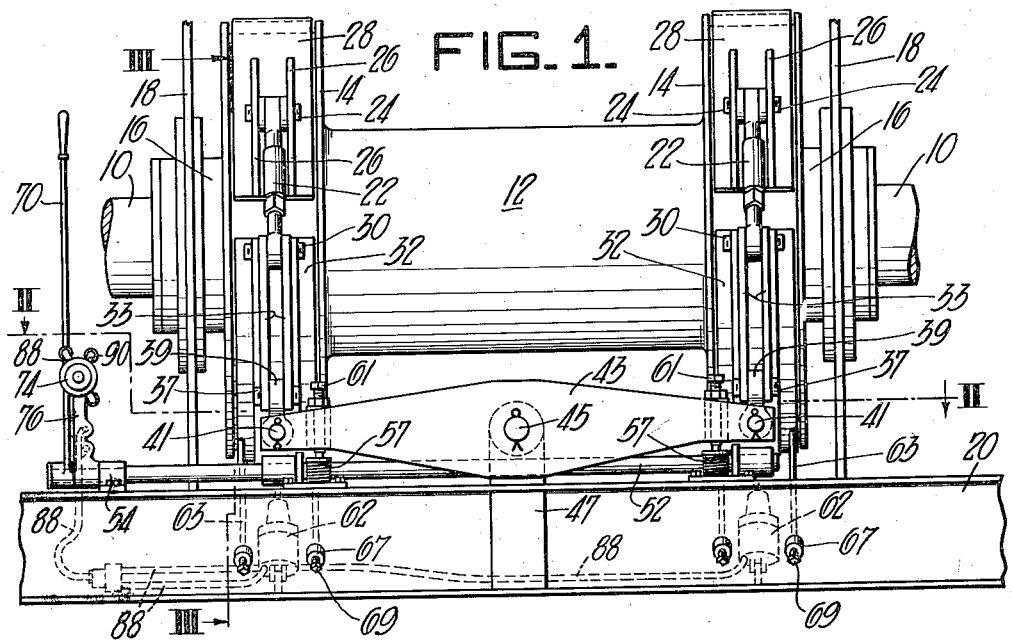
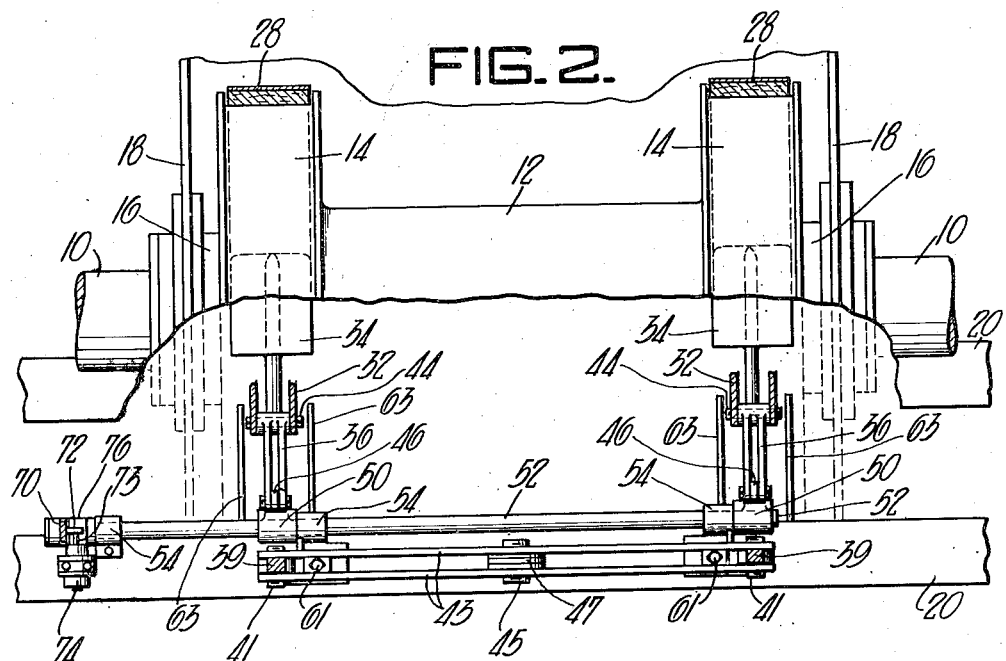
Inventors:
CHARLES J. KEIM and
AUGUST R. MAIER,
by: Donald G. Dalton
their Attorney.

March 22, 1949.  A. R. MAIER ET AL  2,465,164
HOIST BRAKES WITH EQUALIZER AND POWER BOOSTER
Filed June 5, 1946  5 Sheets-Sheet 2
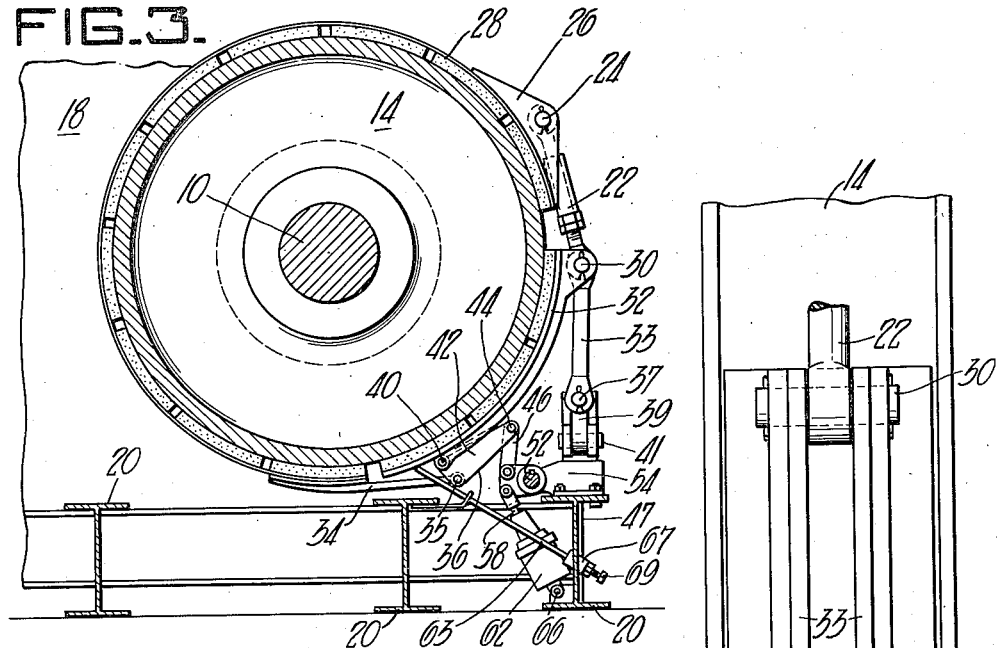
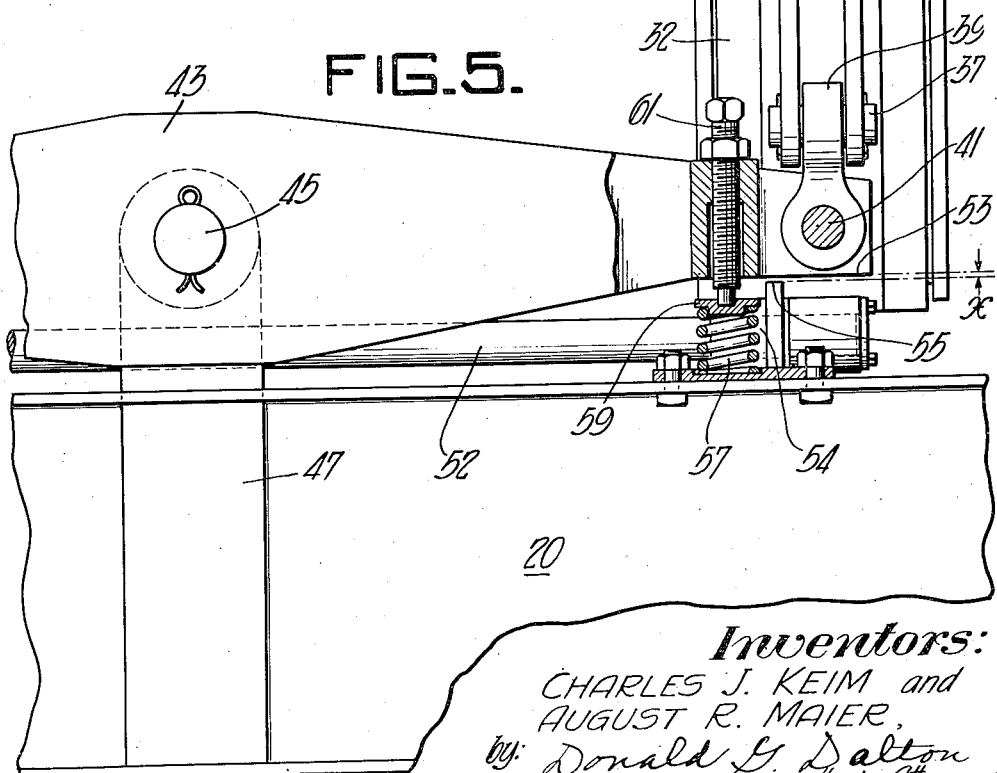
Inventors:
CHARLES J. KEIM and
AUGUST R. MAIER,
by: Donald G. Dalton
Their Attorney

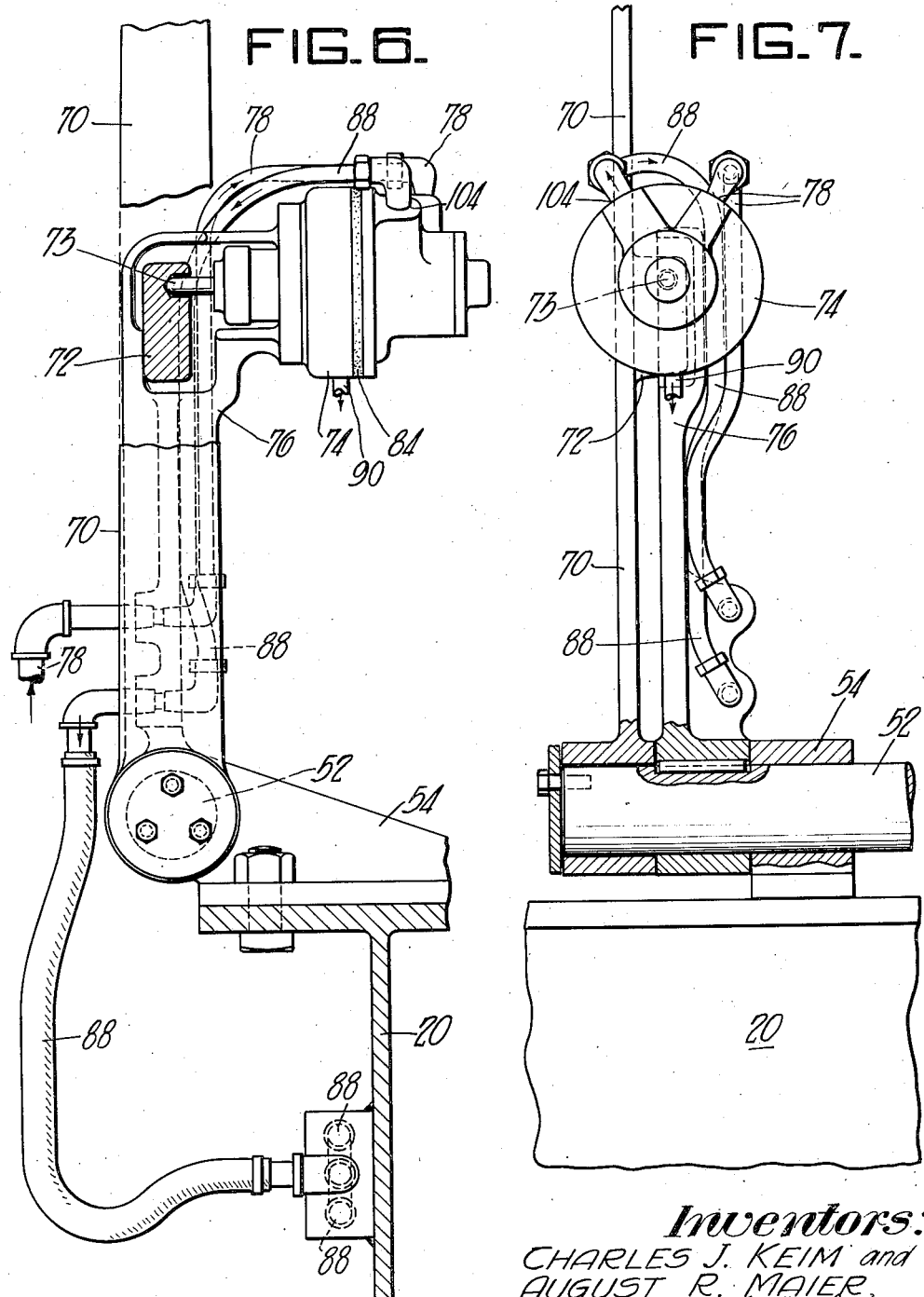

March 22, 1949.  A. R. MAIER ET AL  2,465,164
HOIST BRAKES WITH EQUALIZER AND POWER BOOSTER
Filed June 5, 1946  5 Sheets-Sheet 5

Inventors:
CHARLES J. KEIM and
AUGUST R. MAIER,
by: Donald G. Dalton
their Attorney.

Patented Mar. 22, 1949

2,465,164

UNITED STATES PATENT OFFICE 2,465,164

HOIST BRAKE WITH EQUALIZER AND POWER BOOSTER

August R. Maier and Charles J. Keim, Oil City, Pa., assignors to Oil Well Supply Company, a corporation of New Jersey Application June 5, 1946, Serial No. 674,613

7 Claims. (Cl. 188—77)

The present invention relates to the herein disclosed features of improvement over the heavy duty brake apparatus shown in Maier Patent No. 2,257,722, dated September 30, 1941. While not limited thereto, the invention is especially well suited for use on a hoist or winch forming part of the drawworks of an oil field drilling rig. The chief features of improvement over the above mentioned patent relate to changes in the arrangement of brake operating linkage and toggles to provide for better equalization of the braking action on a plurality of drums, to provide greater accessibility to facilitate making adjustments to compensate for wear and the provision of a power booster and controlling means therefor coordinated with the manually operable brake lever.

The foregoing and related features of the invention will be more fully apparent from a consideration of the following specification and the appended claims when read in connection with the accompanying drawings, in which:

Figure 1 is an elevation of the winch and braking mechanism of an oil field drawworks as viewed from a point adjacent the dead end anchorages of the brake bands;

Figure 2 is a horizontal section on line II—II of Figure 1 showing the brake operating rock shaft, the equalizer and related parts;

Figure 3 is a vertical section on line III—III of Figure 1;

Figure 5 is a detail view of the equalizer lever and related parts;

Figure 6 is a detail view of the manually operable brake lever and the booster valve lever coacting therewith;

Figure 7 is an elevation of Figure 6 with parts broken away and shown in section.

Figure 4:
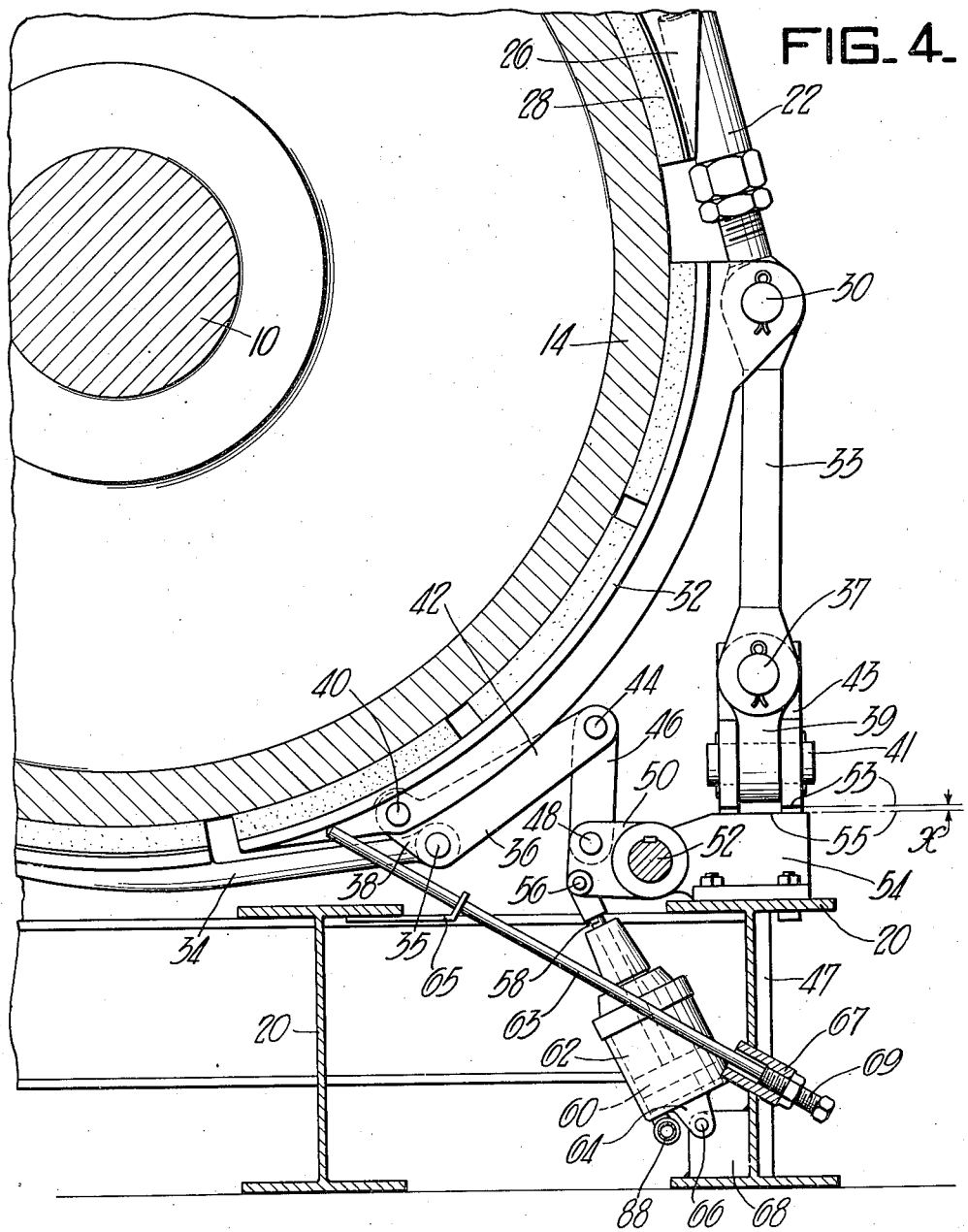
Figure 4 is an enlarged detail of parts of the brake operating mechanism of Figure 3.

The invention is illustrated as applied to the heavy duty winch or hoist of an oil field drawworks used to lift and lower great lengths of heavy drill pipe or well casing. Such winches frequently have to handle loads weighing many tons, and thus it is apparent that it is important that the driller shall have the mechanism under positive control at all times in order to prevent damage to equipment and possible injury to workmen.

Referring in detail to the drawings, 10 represents a shaft supporting a winch 12 having spaced brake drums 14—14 at the opposite ends thereof. The shaft is supported in suitable bearings 16—16 mounted on housings 18—18 which in turn are secured to base girders 20.

The invention is embodied in substantially duplicate braking instrumentalities associated with the tandem brake drums 14—14, thus a description of the elements coacting with one of the drums will suffice for both. The mechanism of the present invention differs from that shown in the above mentioned Maier patent in that the turnbuckle link connecting means which provides for adjusting the brakes and compensating for wear of the linings, is interposed between the dead end of the brake band and the shoe instead of between the live end of the band and the shoe as in the patent. The improved arrangement brings the adjusting means around to the front of the brake assembly, at which location it is more readily accessible and can hence be more easily and quickly adjusted. This change of location of the parts will be apparent by comparing Figure 2 of the patent with Figure 3 of the drawings of the instant application. According to the teachings of the present invention, an adjustable turnbuckle link 22 is pivotally connected by a pin 24 with a fitting 26 secured to the dead end of each flexible brake band 28 and the opposite end of each adjustable turnbuckle link is pivotally connected by a pin 30 with a brake shoe 32. Links 33 are connected at their upper ends to the pin 30 and at their lower ends to a pin 37 secured to a universal link 39 which is secured to a pivot pin 41 located at the end of an equalizer lever 43 which is pivotally mounted at 45 to a bracket 47 supported by the I-beam 20.

The live end of each brake band includes a fitting 34 which is pivotally connected by a pin 35 with a bell crank 36 having a relatively short toggle arm 38 connected by a pin 40 with the portion of the shoe 32 remote from its connection with the dead end of the brake band. The long arm 42 of each bell crank is connected by a pin 44 with a link 46 which is connected by a pin 48 with a respective arm 50 keyed or otherwise secured to a brake operating rock shaft 52 mounted in suitable bearings 54. Each arm 50 is connected by a pin 56 with the end of a rod 58 carried by a piston 60 working in a respective cylinder 62 having a supporting lug 64 pivoted on pin 66 to a respective bracket 68 secured to the I-beam 20.

As best shown in detail in Figure 5, precision means are provided for positioning the equalizer in such manner as to provide an equal clearance at each end thereof. This clearance is indicated by the distance $x$ between the parallel horizontal broken lines of Figure 5, which corresponds to the space between the bottom edge 53 of each extreme end of the equalizer lever and the top edge 55 of a bracket 54 forming a stop which is bolted to the flange of the I-beam 20. Precision means for maintaining this clearance are provided at each end of the equalizer by a respective compression spring 57 seated in a cavity in the bracket 54 and reacting through a washer 59 against an adjusting screw 61 threaded through an end portion of the equalizer and carrying a lock nut as shown.

Since the means just described for maintaining a precise amount of clearance is adjustable to compensate for wear and since the turnbuckle link 22 is also adjustable, we provide a normally fixed abutment for the brake shoe in the form of a pair of elongated rods 63 each positioned in a guide hole formed in a fixed bracket 65 and in a hole in a boss 67 welded to the web of the beam 20. The inner end of each rod 63 serves as a stop for the brake shoe 32. The outer end of the rod 63 bears against a screw 69 threaded in the boss 67 and carrying a lock nut as shown. Thus the initial positioning of the shoe in the exact position desired to give a slight clearance is made possible and further adjustments can be readily made after the parts become worn as a result of long and continued use in the field.

Figure 8:
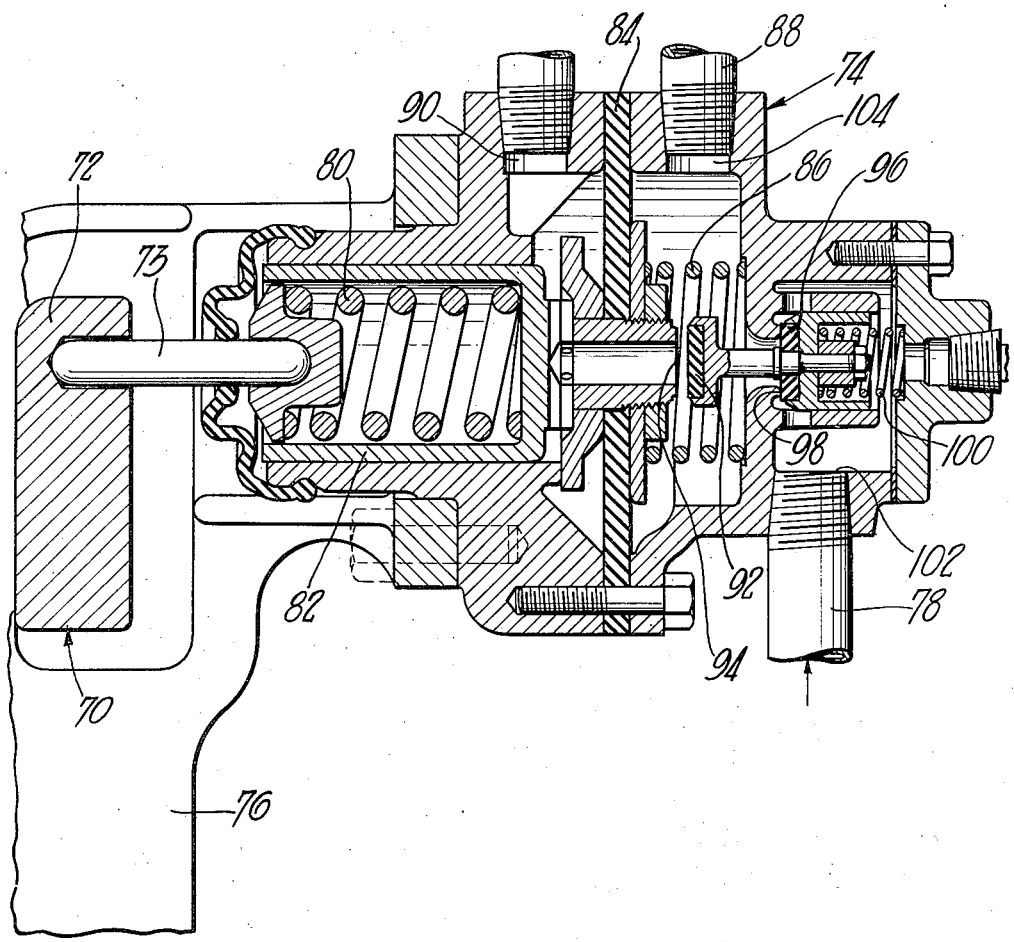
Figure 8 is a sectional view of the control valve shown in Figures 6 and 7.

Loosely mounted on the rock shaft 52 there is a manually operable lever 70 having a lug or abutment 72 thereon for coaction with the spring loaded pin 73 of a pressure compensating valve 74 carried by a booster lever 76 keyed to the rock shaft 52. The valve 74 controls the flow of compressed air to the cylinders 62 from a suitable source of supply to which it is adapted to be connected by a supply pipe 78. The valve 74 includes the heavy spring 80 which presses the pin 73 against the lug 72 on the lever 70. Spring 80 is carried by a member 82 secured to a flexible diaphragm 84 which is acted upon by a spring 86. With the brakes released, the valve parts assume the positions shown in Figure 8, thus the brake cylinders 62 which are connected by pipes 88 to the valve are in communication with the exhaust port 90, since the valve element 92 at this time is not engaged with its seat 94.

When the brakes are to be applied the operator rocks the manually operable lever 70 which causes the abutment or lug 72 thereof to force the spring loaded pin 73 inward against the action of spring 80, thus closing valve element 92 against its seat 94 and preventing escape of air via exhaust port 90. Continued movement of the hand lever 76 will exert a manual braking force, which at this stage is transmitted through the push pin 73 and compression spring 80, with the result that the booster lever (which is keyed to rock shaft) will rock the shaft and thereby manually contract the two bands about the two brake drums with a substantially equal force due to the connections through the equalizer as above described. After the spring loaded pin 73 has been forced in against the action of the spring 80 for a predetermined distance, corresponding to the magnitude of manual braking effort desired, the valve 96 will be moved away from its seat 98 against the action of the light spring 100. The unseating of valve 96 will establish communication between intake port 102 and brake cylinder port 104, thus fluid pressure from supply pipe 78 will flow via brake pipe 88 to the two brake cylinders 62 and thereby act as a power booster to augment the manual braking action exerted by the operator. The combined action of the manually operable lever and the booster mechanism as shown and described is such that the more force required to set the brakes, the harder the lug 72 on the lever 70 is pressed against the spring loaded pin 73, the higher the air pressure which is admitted to the booster cylinders 62 whose pistons 60 are operatively connected to the rock shaft 52. When the manual force exerted on the hand lever is released, the pin 73 is returned by the spring 80 to the neutral position shown in Figure 8, whereupon the valve 92 opens, thus vents the brake cylinders through the exhaust port 90 and the supply of air pressure to the brake cylinders is cut off by the closing of the valve 96.

Although we have shown and described an embodiment of the invention which an actual reduction to practice has demonstrated to be highly advantageous, it is not to be construed that we are limited thereto, since various modifications and substitutions may be made by those skilled in the art without departure from the invention as defined in the appended claims.

We claim:

1. Hoisting apparatus for an oil field drawworks comprising a winch having spaced brake drums, a band coacting with each drum having dead and live end portions, a respective shoe coacting with a portion of each drum between said end portions of each band, an adjustable connecting member between the dead end of each band and the adjacent end of each shoe, an equalizer flexibly connected at each end to a respective link which is connected to one of said shoes at its point of connection with said connecting member, a rock shaft having brake actuating arms secured thereto, respective bell cranks each having a long and a short arm, each said long arm being link connected to one of said brake actuating arms and each said short arm being pivotally connected with the end of said shoe remote from the dead end of the band, and means pivotally connecting the live end of the band with said bell crank at the point of intersection of the center lines of the long and short arms thereof, whereby pivotal movement of said bell cranks simultaneously engages said brake bands and said brake shoes with said brake drums.

2. Hoisting apparatus for an oil field drawworks comprising a winch having spaced brake drums, bands coacting with said drums having respective dead and live end portions, an equalizer pivoted intermediate sand bands operatively connected with the dead ends thereof, a brake operating rock shaft having a manually operable lever loosely mounted thereon, a booster lever tight on the said shaft, a source of fluid pressure, a control valve carried by the booster lever connected with said source of fluid pressure, a booster cylinder having a piston therein operatively connected with said rock shaft, linkage operatively connecting the live end of each band and said shoe with said rock shaft, said manually operable lever having a lug for coaction with said valve, the valve being so constructed and arranged that when actuated by the lug of said lever it will establish communication between said source of fluid pressure and said booster cylinder whereby said piston will apply a torque to said rock shaft effective to augment the braking action exerted thereon by said manually operable lever.

3. Hoisting apparatus for an oil field drawworks comprising a winch having spaced brake drums adjacent the opposite ends thereof, a respective band encircling each drum having respective dead and live end portions, an equalizer pivoted intermediate said bands and having adjustable means operatively connected with the dead end of each band, a brake operating shaft having a manually operable lever loosely mounted thereon, a booster lever tight on said shaft, a valve carried by the booster lever having a spring loaded control pin, a source of fluid pressure, booster cylinders each having a piston therein operatively connected with a respective arm of the shaft, said manually operable lever having a lug for engaging said control pin, the pin being effective when pressed in by said lug to establish a connection between said source of fluid pressure and said booster cylinders, whereby the pistons within the latter apply a torque to the spaced arms of the shaft effective to augment the braking action exerted on the shaft by said manually operable lever.

4. Hoisting apparatus for an oil field drawworks comprising a winch having spaced brake drums, a respective band encircling each drum and having respective dead and live end portions, an equalizer pivoted intermediate said bands, respective swivel fittings pivotally connecting the extremities of the equalizer to links which are pivotally connected to adjustable turn-buckles which are pivotally connected to the dead ends of the brake bands, fixed stops spaced equal distances from the opposite ends of the equalizer, respective springs coacting with the opposite ends of the equalizer normally maintaining an equal spacing between the ends of the equalizer and said fixed stops, a brake operating shaft having a manually operable lever loosely mounted thereon, an arm secured to said shaft having a link connection with a live end of the brake band, a booster cylinder having a piston therein operatively connected with said shaft, a source of fluid pressure communicating with said cylinder and valve means actuated by said manually operable lever variably controlling the supply of fluid pressure to said cylinder by and in accordance with force manually applied to said manually operable lever.

5. Hoisting apparatus for an oil field drawworks comprising a winch having a brake drum, a band encircling the drum having respective dead and live end portions, a shoe coacting with the brake band intermediate said dead and live end portions, adjustable means pivotally connecting one end of said shoe with the dead end of the band, means connecting said end of the shoe with a pivotally supported anchorage, yielding means for normally maintaining said anchorage in a predetermined position, a brake operating shaft having a manually operable lever loosely mounted thereon, a booster lever tight on said shaft, a valve carried by the booster lever having a spring loaded control pin therein coacting with a lug on the manually operable lever, an arm secured to said shaft, a cylinder having a piston therein operatively connected with said arm, said valve being constructed and arranged to vary the pressure exerted on the piston by and in accordance with the manual effort applied to said control pin through said manually operable lever, a bell crank having a long arm link-connected with the arm on said shaft and having a short arm pivotally connected with the end of said shoe remote from the dead end of the band, said bell crank having a pivotal connection with a member secured to the live end of the brake band, and an elongated stop rod adjustably mounted in a fixed support, said shoe having an abutment for coaction with the extremity of said stop rod.

6. Hoisting apparatus for an oil field drawworks comprising a winch having spaced brake drums, a band coacting with each drum having dead and live end portions, a respective shoe coacting with a portion of each drum between end portions of each band, an adjustable connecting member between the dead end of each band and the adjacent end of each shoe, an equalizer flexibly connected at each end to a respective link which is connected to one of said shoes at its point of connection with said connecting member, a rock shaft having brake actuating arms secured thereto, respective bell cranks each having a long and a short arm, each said long arm being link connected to one of said brake actuating arms and each said short arm being pivotally connected with the end of said shoe remote from the dead end of the band, the live end of the band being pivotally connected with said bell crank at the point of intersection of the center lines of the long and short arms thereof, and fixed supports having stop rods adjustably secured thereto, each said brake shoe including a portion remote from its point of connection with the dead ends of the bands for coaction with the inner extremity of said stop rods.

7. Hoisting apparatus for an oil field drawworks comprising a winch having spaced brake drums, a band coacting with each drum having dead and live end portions, a respective shoe coacting with a portion of each drum between said end portions of each band, an adjustable connecting member between the dead end of each band and the adjacent end of each shoe, an equalizer flexibly connected at each end to a respective link which is connected to one of said shoes at its point of connection with said connecting member, a rock shaft having brake actuating arms secured thereto, respective bell cranks each having a long and a short arm, each said long arm being link connected to one of said brake actuating arms and each said short arm being pivotally connected with the end of said shoe remote from the dead end of the band, the live end of the band being pivotally connected with said bell crank at the point of intersection of the center lines of the long and short arms thereof, respective fixed stops spaced equal distances from the free ends of the equalizer, and respective springs coacting with said free ends and normally maintaining an equal working braking clearance between each free end of the equalizer and the said fixed stop adjacent thereto.

AUGUST R. MAIER.
CHARLES J. KEIM.

REFERENCES CITED

The following references are of record in the file of this patent:

UNITED STATES PATENTS

| Number | Name | Date |
| --- | --- | --- |
| 1,956,433 | Young | Apr. 24, 1934 |
| 2,009,574 | Campbell | July 30, 1935 |
| 2,257,722 | Maier | Sept. 30, 1941 |